(12) United States Patent
Maryfield et al.

(10) Patent No.: US 8,587,776 B2
(45) Date of Patent: Nov. 19, 2013

(54) MINIATURE LASER SEEKER ELECTRO-OPTICS

(75) Inventors: Tony Maryfield, Poway, CA (US); Richard Trissel, Gualala, CA (US); David A. Robinson, San Diego, CA (US); Robert William Parry, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 13/468,096

(22) Filed: May 10, 2012

(65) Prior Publication Data

US 2012/0287423 A1 Nov. 15, 2012

Related U.S. Application Data

(60) Provisional application No. 61/486,196, filed on May 13, 2011.

(51) Int. Cl.
*G01J 1/00* (2006.01)

(52) U.S. Cl.
USPC .......................................................... 356/213

(58) Field of Classification Search
USPC .......................................................... 356/213
See application file for complete search history.

(56) References Cited

U.S. PATENT DOCUMENTS

| | | | | |
|---|---|---|---|---|
| 4,625,108 | A | * | 11/1986 | Nestel et al. ............. 250/227.11 |
| 6,097,481 | A | | 8/2000 | Coffery et al. |
| 6,507,392 | B1 | | 1/2003 | Richards et al. |
| 2006/0180746 | A1 | | 8/2006 | Muenter et al. |
| 2010/0059658 | A1 | * | 3/2010 | Chen et al. ................. 250/203.1 |
| 2010/0108859 | A1 | | 5/2010 | Andressen |

OTHER PUBLICATIONS

International Search Report and Written Opinion of PCT/US12/037566 mailed on Nov. 28, 2012, 9 pages.

* cited by examiner

*Primary Examiner* — Tu Nguyen
(74) *Attorney, Agent, or Firm* — Kilpatrick Townsend & Stockton LLP

(57) ABSTRACT

Techniques are disclosed for sensing a location of laser and/or other optical signals. According to certain embodiments of the invention, an electro-optical assembly can include a detector array coupled to one or more lenses for detecting the signals. Outputs of the photo detectors can be processed using peak detection and/or other techniques to conserve power, help ensure detection, and avoid the need for moving parts.

20 Claims, 5 Drawing Sheets

Rear View

Side View

MINIATURE LASER SEEKER ELECTRO-OPTICS

CROSS-REFERENCES TO RELATED APPLICATIONS

The present application claims benefit under 35 USC 119(e) of U.S. Provisional Application No. 61/486,196, filed on May 13, 2011 of which the entire disclosure is incorporated herein by reference for all purposes.

BACKGROUND

Light detection in optical devices can take on various forms, according to the form and function of the optical device, among other concerns. For example, systems for detecting a laser (or other optical) designation signal can be incorporated into munitions-guidance systems. It can be difficult, however, to implement such systems without scanning components and/or cameras. Problematically, however, scanning components have breakable moving parts, and both scanning components and cameras can have difficulty detecting a narrow-pulse laser designation signal with a low duty cycle, especially in high-noise (e.g. daylight) conditions.

BRIEF SUMMARY

Techniques are disclosed for sensing a location of a laser and/or other optical signals. According to certain embodiments of the invention, an electro-optical assembly can include a detector array coupled to one or more lenses for detecting the signals. Outputs of the photo detectors can be processed using peak detection and/or other techniques to conserve power, help ensure detection, and avoid the need for moving parts.

In one embodiment an electro-optical assembly can include one or more optical lenses, a plurality of photo detectors configured to receive incoming light that passes through the one or more optical lenses, and electrical circuitry. The electrical circuitry can be configured to, for each of the plurality of photo detectors, generate a signal based on an output of the photo detector, determine a maximum value of the signal for a certain period of time, and convert the maximum signal value to a digital signal. The electro-optical assembly further can include a processing unit configured to receive the digital signal of each of the plurality of photo detectors, and determine a direction of the incoming light based, at least in part, on the received digital signals of the plurality of photo detectors.

The electro-optical assembly can include one or more of the following features. The one or more optical lenses can include at least one of silicon (Si), optical glass, indium gallium arsenide (InGaAs), or germanium (Ge). The electrical circuitry configured to generate the signal can include a transimpedance amplifier (TIA). The electrical circuitry can be configured to determine the maximum value of the signal is a peak hold reset (PHR) circuit. Each of the plurality of photo detectors can comprise at least one of an avalanche photodiode (APD) or a PIN photodiode. The electro-optical assembly can include a spectral filter configured to reject or pass at least a portion of the incoming light before the incoming light reaches the plurality of photo detectors. The plurality of photo detectors can include a first substrate, and the electrical circuitry can include a second substrate coupled with the first substrate. The one or more optical lenses can include a single optical lens coupled with the plurality of photo detectors. Electrical circuitry can be configured to, for each of the plurality of photo detectors, increase an amplitude of the signal based on the output of the photo detector if an amplitude of the signal is below a certain threshold level. Each of the plurality of photo detectors can have a width of about 200 microns and a length of about 200 microns. The plurality of photo detectors are disposed on a substrate and configured to receive the incoming light after the incoming light passes through the substrate.

In another embodiment, a method for detecting an optical signal can include receiving the optical signal through one or more optical lenses, using a plurality of photo detectors to detect the optical signal after the optical signal passes through the one or more optical lenses, and generating a plurality of electrical signals, where each signal corresponds with an output of each of the plurality of photo detectors. The method can also include determining, for a certain period of time, a maximum value of each of the plurality of signals, converting each maximum value to a digital signal, and calculating, with a processing unit, a direction of the optical signal based, at least in part, on the received digital signals of the plurality of photo detectors.

The method for detecting an optical signal can include one or more of the following features. Generating the plurality of signals can include converting a plurality of currents into the plurality of voltages. The method can include using a spectral filter configured to allow at least a portion of the optical signal having a wavelength of about 1.5 microns to reach at least a portion of the plurality of photo detectors. Calculating the direction of the optical signal can include determining which of the plurality of photo detectors received detected the optical signal with an amplitude above a certain threshold. Generating the plurality of signals can include using circuitry on a different substrate than a substrate on which the plurality of photo detectors is disposed.

In yet another embodiment, a method of manufacturing an electro-optical assembly can include providing one or more optical lenses, and coupling a plurality of photo detectors to the one or more optical lenses such that the plurality of photo detectors are configured to receive incoming light that passes through the one or more optical lenses. The method can further include coupling electrical circuitry to the plurality of photo detectors, where the electrical circuitry is configured to, for each of the plurality of photo detectors, generate a signal based on an output of the photo detector, determine a maximum value of the signal for a certain period of time, and convert the maximum value to a digital signal. The method can additionally include coupling a processing unit to the electrical circuitry, where the processing unit is configured to receive the digital signal of each of the plurality of photo detectors, and determine a direction of the incoming light based, at least in part, on the received digital signals of the plurality of photo detectors.

The method of manufacturing the electro-optical assembly can include one or more of the following features. Coupling a spectral filter to the one or more optical lenses such that the spectral filter passes or rejects at least a portion of the incoming light. Coupling the electrical circuitry to the plurality of photo detectors can include coupling the electrical circuitry disposed on a first substrate to the plurality of photo detectors disposed on a second substrate. Coupling the plurality of photo detectors to the one or more optical lenses can include configuring the plurality of photo detectors to receive the incoming light after the incoming light passes through a substrate on which the plurality of photo detectors is disposed.

Numerous benefits are achieved by way of the present invention over conventional techniques. For example, embodiments of the present invention can utilize wide field of view (FOV) detection so that scanning may not be necessary, thereby avoiding the need for moving parts. This can allow for a smaller, cheaper, more durable, and/or lower-power electro-optical device. Additionally, power-saving techniques are employed while preserving enough sensitivity to detect an optical signal in high-noise environments. These and other embodiments of the invention, along with many of its advantages and features, are described in more detail in conjunction with the text below and attached figures.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

Figure 1B:
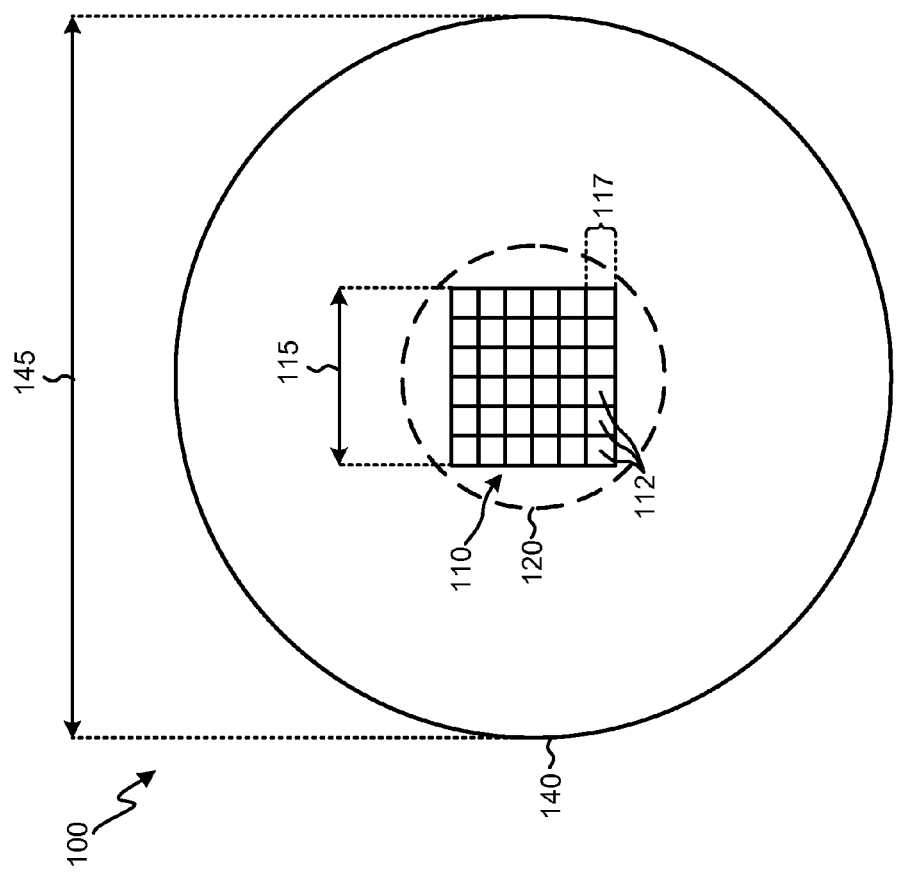
FIGS. 1A and 1B are simplified side and rear views of one embodiment of a Miniature Laser Seeker Electro-optics (MLSE).

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Light detection is a key component of various optical-sensing devices. Laser range finding, target acquisition, combat identification, laser tracking, space-to-ground communication, and other applications require light detection to capture and process light signals from a remote light source, such as a pulsed laser. This light detection is typically performed by a light sensor in an optical system of an optical device, which allows light to be directed toward and focused on the light sensor.

Directional light detection, i.e., determining a direction or "angle of arrival" from which light is detected, can add additional complexity to a light detection system. Traditional directional light detection systems include moving components to be able to scan a large area by moving a mirror, lens, or other component in a scanning pattern to detect an optical signal. Because the field of view (FOV) of the optics of these systems is narrow, a direction may be determined simply by analyzing the configuration of the optical system (e.g., which direction a component is pointed) to determine the direction of the optical system. Alternatively, a traditional light detection system may include a camera, in which case the direction of an optical signal can be determined by determining which pixels of the camera detect the optical signal.

Although these traditional techniques may be suitable for some applications, they are not suitable for others. For example, space may be extremely limited in an optical system utilized in guided munitions. Thus, traditional systems having moving parts that require additional space may be undesirable. The moving parts of the traditional systems may also break under the extreme forces to which they may be exposed in guided munitions applications. Furthermore, scanning systems typically require a large amount of power.

More importantly, traditional scanning systems can have difficulties detecting an optical designation signal used to direct guided munitions. In some applications, for example, an optical designation signal is provided by a laser shining on a target, where the optical designation signal has a pulse width (PW) of only approximately 10 ns, pulsing at a pulse repetition frequency (PRF) of approximately 20 Hz (or approximately 50 ms between pulses). Because the duty cycle of these pulses is so low, scanning systems may miss the optical designation system entirely because, during the short period of the pulse time of the optical designation signal, only a small portion of the scanning area is being scanned.

Cameras can also fail to detect such signals because each pixel of the camera collects light for far too long, integrating a light signal over several milliseconds. (Video applications, for example typically collect light during a "frame time" that lasts about 16 ms.) Thus, signal energy from a pulse of the optical designation signal that may be detected by a pixel can be drowned out by noise energy captured during the camera's frame time. For example, in applications where there is approximately 50 ms between 10 ns pulses, a camera would need to integrate over those 50 ms in order not to miss any signal pulses (which can arrive at largely unknown times). Under a daytime operational scenario, the background energy from scattered solar irradiance (even when spectrally filtered to minimize that energy) "seen" by the camera will swamp out the desired signal, and may also saturate the camera's pixels (called "blooming"). Thus, optical designation signals with such short PWs and low duty cycles can be undetectable with traditional systems that utilize scanning and/or camera techniques. Also, the interfering background is not limited to solar irradiance. It could for example be from another source, or even a jammer. Therefore the filter doesn't have to be band pass. It could also be high pass, low pass, or band reject—depending on the application and characteristics of the desired and interfering signals.

Embodiments of the present invention provide for Miniature Laser Seeker Electro-optics (MLSE) that can offer a wide FOV, high-sensitivity laser seeker compact and rugged enough to fit into smaller munitions, and work with current and planned laser designators operating at mid-infrared wavelengths. In some embodiments, such as those described herein, the FOV can be about 19 degrees, but more or fewer photo detectors in a larger or smaller array or matrix can be used to achieve larger or smaller FOVs. This technique may be used to "see" over the entire field of view for laser beam acquisition while overcoming the high background solar load and/or low pulse repetition rates, thereby avoiding the shortcomings of traditional scanning and camera techniques.

One embodiment achieves a wide field of view simultaneously with high sensitivity in a bright solar background while operating at a 1.5 micron operating wavelength. (Other embodiments could use other wavelengths). Other applications include, laser guided munitions, covert communications, optical combat identification, asset tracking, target locating, position control systems, and the like. Other applications where the detection assembly is moving fast; the laser (or other optical signal) is moving fast; and/or size, weight, and/or power are factors can be good candidates for this embodiment. In some embodiments, multiple optical signals could be tracked simultaneously. When one is selected, the other optical signals could be ignored to track fewer pulses.

Figure 1A:
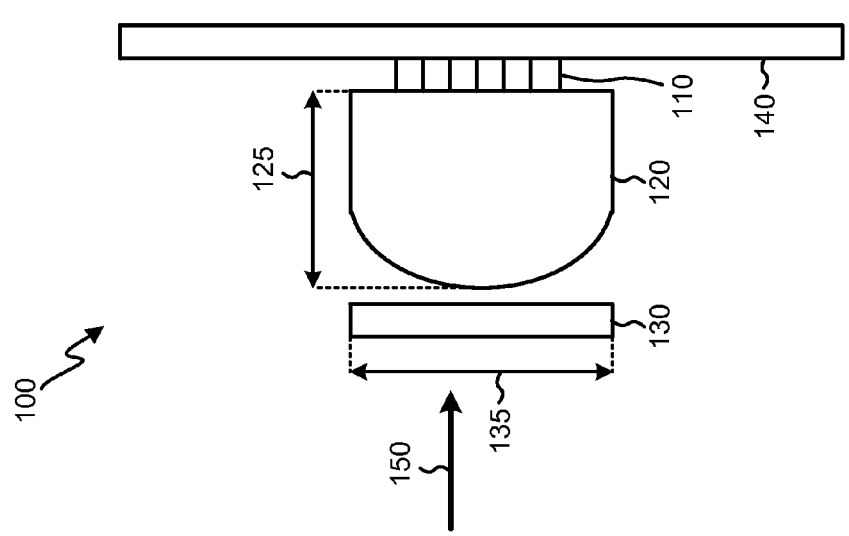

FIGS. 1A and 1B illustrate respective side and rear views of one embodiment of an MLSE 100. With a compact design and no moving parts, this embodiment can be utilized in a variety of applications, such as guided munitions. With reference to FIGS. 1A and 1B, the MLSE physical and optical layout is shown in one embodiment, which results in both a wide FOV and the small size and ruggedness desired for use in munitions. The basic components of this MLSE 100 can include a lens 120, detector array 110, application-specific integrated circuit (ASIC) circuit board 140, and (optionally) a spectral (e.g., sun rejection) filter 130. A 6×6 detector array 110 is shown for illustration, but other array sizes are possible depending on the application. A person of ordinary skill in the art will recognize various alterations, substitutions, and omissions.

The lens 120, used to focus incoming light 150 onto the detector array 110 can be formed from a material with a relatively high index of refraction at the detectable wavelength, providing a very short focal length. In some embodiments, the lens 120 is formed from silicon (Si), which has a particularly high index of refraction at wavelengths of about 1.5 microns, a wavelength utilized in many applications. Si also can be advantageous because it is a stable material that is easier to handle and polish than other materials. Even so, other materials, such as optical glass, indium gallium arsenide (InGaAs), and/or germanium (Ge), can be used. Some embodiments can include a single lens 120 for the detector array 110, such as the embodiment shown in FIGS. 1A and 1B. Other embodiments can include multiple lenses, such as one lens per photo detector 112 or other subset of the detector array 110. In some embodiments, a high-index lens 120 can be unitary or separate, and/or formed integrally with the matrix of elements.

Embodiments that keep the light in materials with a relatively high refractive index can provide a substantially higher FOV than conventional designs. This enables use of fewer photo detectors 112 for a given overall MLSE 100 FOV, minimizing size, weight, power, and cost (SWAP-C) as well as increased ruggedness. In this embodiment, each detector has a 3.2 degree FOV, but different detectors can utilize different materials and/or have different FOVs, depending on desired functionality.

The thickness 125 of the lens 120 can vary, depending on desired functionality. In one embodiment, for example, the thickness of the condenser lens is 11.5 mm. In other embodiments, the thickness can be 20 mm or higher. Other embodiments include a lens 120 with a thickness of 2.5 mm or less. Such thicknesses can depend on numerous factors, including the index of refraction of the material from which the lens 120 is formed.

The detector array 110 can be an integrated circuit comprising an array of individual photo detectors 112 (e.g., avalanche photodiodes (APDs), PIN photodiodes, and/or other light sensors) having an active area disposed on a substrate. The substrate can be index-matched and intimately mated to the lens 120 in a flip-chip configuration to create an immersion lens, ensuring the light is kept in a material with a high index of refraction (relative to air) until the light illuminates an active area of the detector array 110. In such a configuration, the substrate of the detector array 110 can be transparent to at least the portion of the incoming light 150 focused by the lens 120 that is to be detected by the active area of the detector array 110. In one embodiment, for example, a Si lens 120 is coupled with a detector array 110 having an indium phosphide (InP) substrate to illuminate an active area comprising indium gallium arsenide (InGaAs). (Both Si and InP are transparent to light having a wavelength of about 1.5 microns, and are therefore useful in applications utilizing that wavelength.)

The substrate of the detector array 110 can be optically contacted with the lens 120 to help ensure total internal reflection (TIR) within the lens 120 is frustrated. Optical contacting, also known as molecular bonding or optical contact bonding, can be a glueless process in which two closely conformal surfaces are bonded by intermolecular (e.g., van der Waals) forces. Achieving the optical contacting requires special attention to issues like lens and detector flatness, surface finish, etc. Additional considerations and other details regarding the lens 120, photo detectors 112, and optical contacting can be found in U.S. patent application Ser. No. 13/240,530 entitled "Wide Field Of View Optical Receiver," which is hereby incorporated by reference in its entirety. Although techniques described above include a flip-chip configuration providing for wide FOV detection, other embodiments of an MLSE 100 can include alternative configurations, depending on desired functionality, manufacturing considerations, and other factors.

The width 115 of the detector array 110 and the width 117 of each photo detector 112 can vary, depending on desired functionality. For example, in the embodiment shown in FIG. 1, the width 115 (and corresponding length) of the detector array can be about 1.3 mm, where the width 117 (and corresponding length) of each photo detector 112 is about 200 microns, with approximately 20 microns between each photo detector 112. In other embodiments, each photo detector 112 can have a width 117 of up to 1 mm or more, or as little as 80 microns or less. Embodiments also can include detector arrays 110 with more or less columns and/or rows, thereby changing the width 115 of the detector array 110 substantially from that shown in FIGS. 1A and 1B. Furthermore, although the detector array 110 and photo detectors 112 shown in FIGS. 1A and 1B are substantially square, other embodiments may include components with different shapes. The width 115 of the detector array 110 and the width 117 of each photo detector 112 can impact on other structural features of the MLSE 100, such as the thickness of the substrate of the detector array 110, the signal-to-noise ratio (SNR), FOV, and other features. The amount of photo detectors 112 included in the photo detector array can determine the granularity of the directional sensing of the MLSE 100.

The ASIC circuit board 140 of the embodiment of the MLSE 100 shown in FIGS. 1A and 1B can include and/or be coupled with an ASIC with circuitry layout designed to minimize parasitics between, for example, each photo detector 112 and a corresponding transimpedance amplifier (TIA), discussed in more detail below in reference to FIG. 2. All or a portion of TIA and/or other circuitry can be on the same substrate as the detectors or on separate substrates, depending on manufacturing concerns and other factors. Die connection manufacturing techniques can be utilized to attach the bare die of the detector array to the bare die of the ASIC, without wire bonds and/or similar connection structures that could create parasitic capacitance and/or inductance that may be unacceptable in certain embodiments. In one embodiment (e.g., a flip-chip topology), the diameter of the ASIC (not shown) is large enough to cover the detector array 110, and the diameter 145 of the ASIC circuit board 140 is about 30 mm, but other embodiments can have a larger or smaller board and ASIC, depending on layout concerns, manufacturing technology (e.g. not employing flip-chip packaging and interconnect techniques), and other factors.

Optionally, the MLSE 100 also can include an spectral filter 130 (e.g., a sun filter) to filter a portion of the incoming light 150. Such a filter can be used to help reduce noise current produced by the detector array 110 as a result of background light. In one embodiment, the diameter 135 of the spectral filter 130 is wide enough to cover the wide FOV of the lens. Other embodiments can have a larger or smaller diameter 135 and/or a differently-shaped filter 130, depending on the desired functionality.

The spectrum passed by the optical filter can vary, depending on the detectable spectrum of the detector array 110, acceptable tolerances for light detection and noise, and other considerations. In one embodiment, it may be desirable to reject visible light and accept mid-infrared or vice versa. Additionally or alternatively, embodiments utilizing a flip-chip topology allow use of the detector array 110 substrate as a filter. An indium phosphide substrate, for example, can provide an inherent long-pass filter.

Figure 2A:
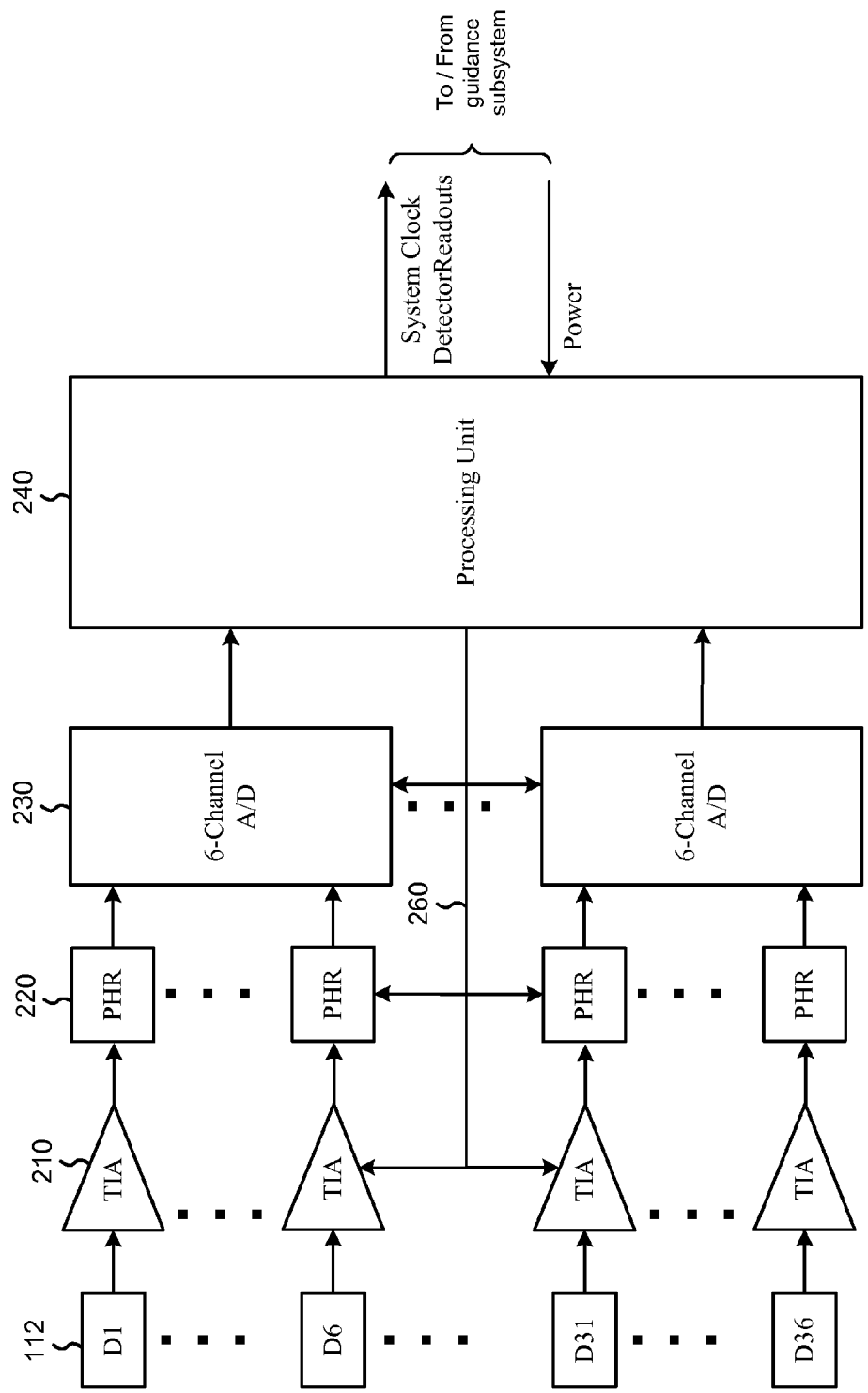
FIGS. 2A and 2B are block diagrams illustrating the circuitry of the MLSE of FIGS. 1A and 1B, according to certain embodiments.

FIG. 2A is a block diagram illustrating the circuitry of the MLSE 100 of FIGS. 1A and 1B, according to one embodiment. The basic components of this embodiment include photo detectors 112, with respective TIAs 210 and Peak Hold Reset (PHR) 220 circuitry. The output of the PHRs 220 is then digitized by A/D converters 230 and fed into a processing unit 240. Again, although components for a 6×6 detector array 110 is shown, other component arrangements are possible, depending on the application. As with the components shown in FIGS. 1A and 1B, components of FIG. 2 can be omitted, combined, and/or separated, according to desired functionality. Furthermore, a person of ordinary skill in the art will recognize various alterations, substitutions, and omissions.

In this embodiment, the MLSE 100 rather than integrating a total incoming optical signal (including background noise) over a frame time, the circuitry continuously detects the incoming signal with a band width (BW) matched to that of the optical designation signal's PW. Thus, by "looking" for pulses rather than integrating or averaging received power over time, the MLSE 100 can detect a single narrow-pulse incoming signal across a wide FOV at any given moment while effectively ignoring noise that would saturate other systems. Here, photo detectors 112 can be AC-coupled to their respective TIAs 210, allowing current induced by the background irradiance to be effectively shunted (i.e., rejected). Fluctuations in this current from photon shot noise and device bias shot noise can still be passed on to the TIAs 210. This noise has far lower power than the currents themselves, and furthermore is not integrated either. The resulting output from the detector is a noise-like signal of average level proportional to the noise, with peaks corresponding to the pulse of the optical designation signal.

Because arrival times of the optical designation signal are often unknown and their PW can be very narrow, one way to ensure no pulse is missed can be to digitize the TIA outputs fast enough that the A/D samples of the A/D converters 230 are less than the PW apart. In the examples provided herein above, this would require a digitization rate of 100-200 MHz. However, such high-rate A/D conversion would consume a large amount of power for one application. In the embodiment shown in FIG. 2, however, TIAs 210 and PHRs 220 have adjustable capture threshold, effective capture BW, and droop rate, however other parameters such as gain/attenuation may be adjusted. Thus, when a signal arrives exceeding the adjustable capture threshold, it can be held for sampling by a much slower (and lower power) A/D converter 230 than would otherwise be required. In some embodiments, TIAs 210 may be analog which can use less power than digital TIAs.

The processing unit 240 can include one or more microprocessors, field-programmable gate arrays (FPGAs), ASICs, and/or other processing circuits, which also can include embedded memory and/or control software, depending on desired functionality. Control lines 250 from the processing unit 240 back to the TIAs 210 and PHRs 220 can allow the processing unit 240 to control the parameters of these circuits. This can, for example, allow the processing unit 240 to shut these circuits down for power conservation, if desired. For example, once an optical designation signal has been acquired, its PRF can be tracked and used to wake up the circuitry when needed around each pulse arrival time to reduce power. Moreover, some embodiments could also detect when the munitions are on the downward portion or another predetermined portion of the trajectory to only power the MLSE 100 when the optical designation signal is likely to be detectable.

Careful, real-time adjustment of the TIA, VGA, and/or PHR parameters can be utilized in one embodiment to minimize the probability of capturing the occasional noise transient peak, or Probability of False Alarm (PFA). At the same time, it can capture the peak of the desired signal with a high Probability of Detection (PD). By real-time monitoring the number of peaks captured and comparing that to the known optical designation signal PRF, the PHR parameters can be optimized for the prevailing conditions. In one embodiment, the A/D digitization rate is 1 MHz or less.

Figure 2B:
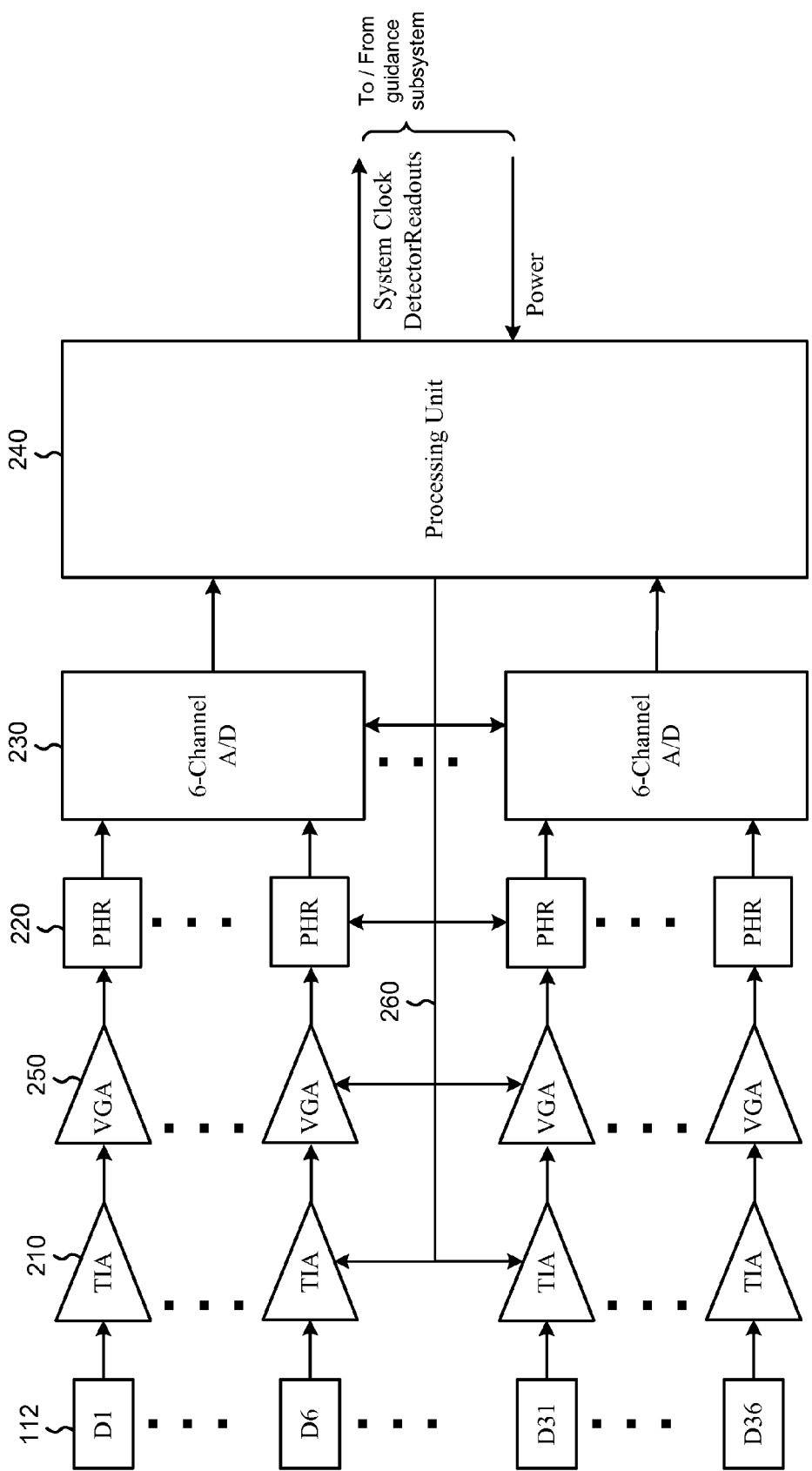

FIG. 2B is block diagram illustrating an embodiment of the circuitry of a MLSE 100 that includes optional variable gain amplifiers (VGAs) 250 that can help optimize the circuitry for the prevailing conditions. In this embodiment, the outputs of the TIAs 210 can be monitored and modified by the VGAs 250 to optimize the signal provided to the PHRs 220. For example, when the output signal level of a TIA 210 is relatively low (e.g., below a certain threshold level), the gain of a respective VGA 250 can be increased to provide a signal with a good SNR to the corresponding PHR 220. On the other hand, when the output signal level of a TIA 210 is relatively high (e.g., above a certain threshold level), both its gain or that of its respective VGA 250 can be decreased to help ensure the signal does not saturate the corresponding PHR 220. Monitoring of TIA 210 and/or PHR 220 outputs, as well as control of VGA 250 gain can be implemented in various ways, such as by a feedback loop.

Figure 3:
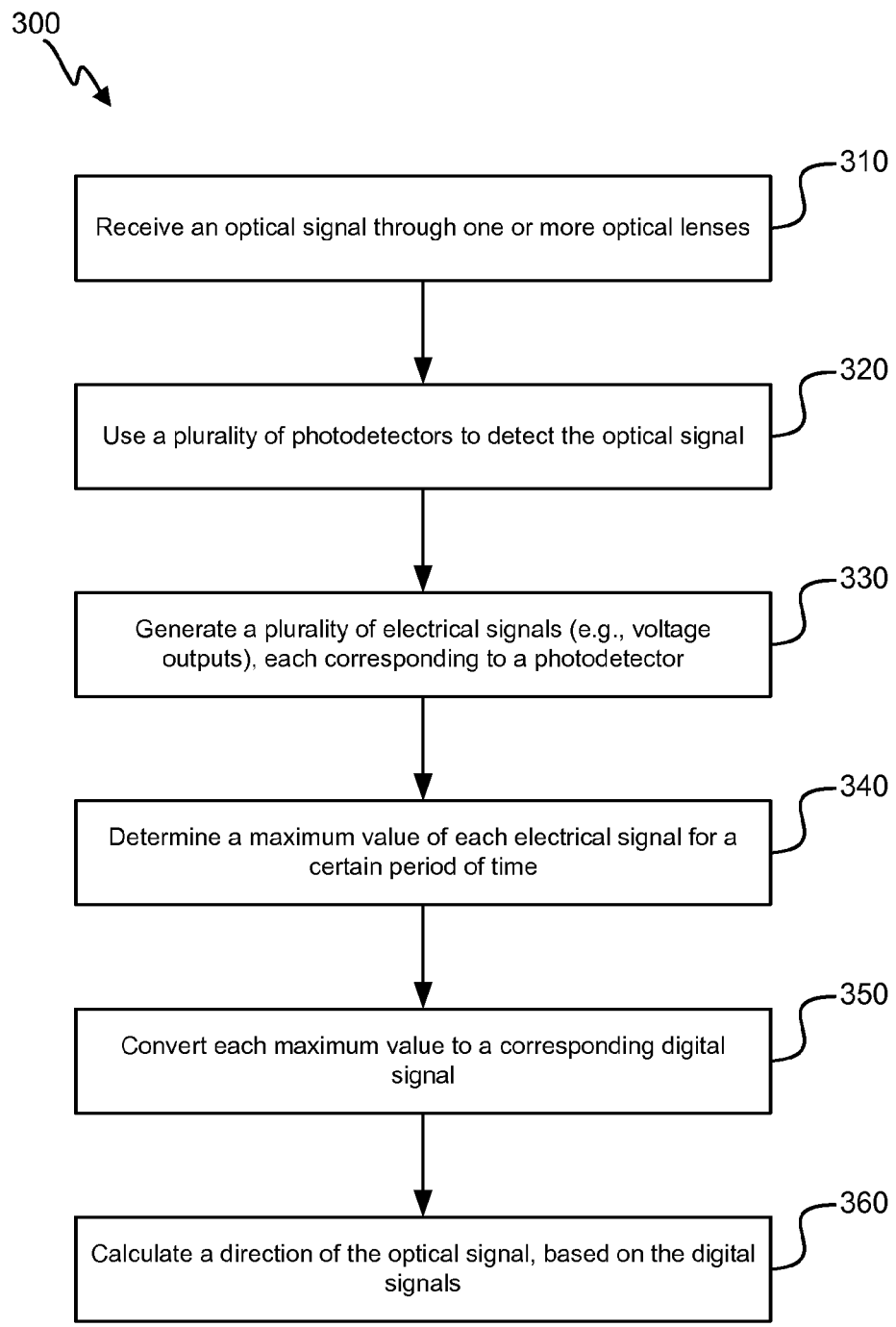
FIG. 3 is a flow diagram illustrating a simplified method for detecting an optical signal utilizing the techniques provided herein, according to one embodiment.

FIG. 3 is a flow diagram illustrating a simplified method 300 for detecting an optical signal utilizing the techniques provided herein, according to one embodiment. The method 300 can be performed, for example, by the MLSE 100 of FIGS. 1 and 2.

At block 310, an optical signal is received through one or more lenses, and at block 320, a plurality of photo detectors is used to detect the optical signal after the optical signal passes through the one or more optical lenses. As discussed earlier, the one or more lenses can include a condenser lens optically coupled with a detector array in a flip-chip configuration to achieve high FOV detection. Alternative embodiments can include multiple lenses and/or lens assemblies where each directs light to a different photo detector and/or subset of photo detectors in a detector array.

At block 330, a plurality of electrical signals (e.g., currents, voltages, etc.) is generated, where each signal corresponds to a photo detector. As described in the embodiments provided herein, each photo detector may have a corresponding TIA or similar circuit configured to generate a voltage from a corresponding current or other detectable change in characteristics (e.g., voltage or resistance) provided by the photo detector. These are normally recognized as the photovoltaic or photoconductive modes of operation.

At block 340, a maximum value of each electrical signal for a certain period of time is determined. This period of time can be determined from an anticipated PRF of the optical signal. As indicated above, PHR circuitry can be utilized to capture a peak in the noise-like output signal of the detectors that correspond with the optical signal. As with the other circuitry discussed herein, circuitry utilized to determine a maximum electrical signal can be included, in whole or in part, on a different substrate than a substrate of the photo detectors. This can depend on various factors, such as desired photo detector density, parasitic values, and/or other layout considerations for a particular application.

At block 340, each maximum value is then converted to a corresponding digital signal. Such conversion can be performed, for example, by an A/D converter. The granularity of the A/D conversion also can depend on various factors, including the input values of the incoming analog signal, functionality of the processing unit, desired sensitivity, and more. Based on the digital signals corresponding to at least a portion of the photo detectors, a direction of the optical signal is calculated, at block 360. For example, a processing unit receiving the digital signals corresponding to the photo detectors can determine that one or more photo detectors have detected an optical signal, if the output amplitude of the photo detector (and resulting digital signal) is above a certain threshold. Because different photo detectors can correlate with different areas within the overall FOV of the system, the processing unit can determine where in the FOV the optical signal is detected. The granularity of the determined direction can be high if a large number of photo detectors are utilized for a given FOV and the digitization is performed with fine granularity. Thus, techniques provided herein can provide for determining the direction of a detected optical signal.

It should be appreciated that the specific steps illustrated in FIG. 3 provide a particular method of detecting an optical signal, according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
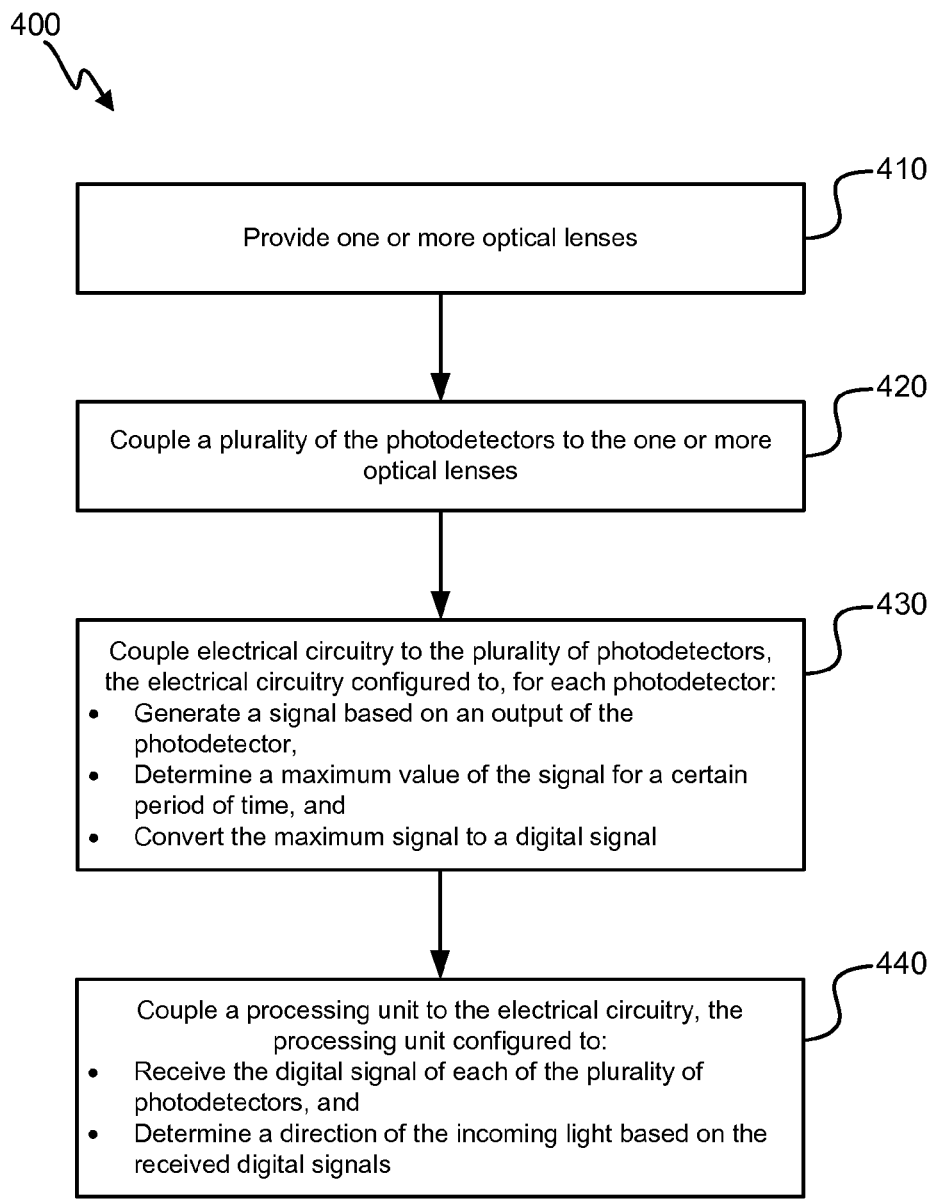
FIG. 4 is a flow diagram illustrating a simplified method for manufacturing an embodiment of an electro-optical assembly, according to one embodiment.

FIG. 4 is a flow diagram illustrating a simplified method for manufacturing an embodiment of an electro-optical assembly, according to the description provided herein. At block 410, one or more optical lenses are provided. At block 420, a plurality of photo detectors is coupled to the one or more optical lenses. Here, the coupling can be such that the plurality of photo detectors is configured to receive incoming light that passes through the one or more optical lenses. Moreover, in a flip-chip configuration, the coupling can be such that the plurality of photo detectors are configured to receive the incoming light after the incoming light passes through a substrate on which the plurality of photo detectors is disposed. Optionally, a spectral filter may be coupled to the one or more lenses such that the filter selectively rejects or passes at least a portion of the incoming light.

At block 430, electrical circuitry is coupled to the plurality of photo detectors. The electrical circuitry can be configured to generate a signal based on an output of the photo detector, determine a maximum value of the signal for a certain period of time, and/or convert the maximum value to a digital signal. As described above, the electrical circuitry can be disposed, in whole or in part, on a substrate separate from a substrate on which the plurality of photo detectors are disposed.

At block 440, a processing unit can be coupled to the electrical circuitry. The processing unit can be configured to receive the digital signals of each of the plurality of photo detectors, and determine a direction (i.e., angle of arrival) of the incoming light based (at least in part) on the received digital signals of the plurality of photo detectors, as described above.

It should be appreciated that the specific steps illustrated in FIG. 4 provide a particular method of manufacturing an electro-optical assembly according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Various components may be described herein as being "configured" to perform various operations. Those skilled in the art will recognize that, depending on implementation, such configuration can be accomplished through design, setup, placement, interconnection, and/or programming of the particular components and that, again depending on implementation, a configured component might or might not be reconfigurable for a different operation.

Implementation of the techniques, blocks, steps, and means described above (in particular, certain blocks shown in FIGS. 3-4) may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific embodiments, it is to be clearly understood that this description is made only by way of example and not as limitation on the scope of the disclosure. Additional implementations and embodiments are contemplated. For example, the techniques described herein can be applied to various forms of optical devices, which may comprise a smaller portion of a larger optical system. Yet further implementations can fall under the spirit and scope of this disclosure.

What is claimed is:

1. An electro-optical assembly comprising:
   one or more optical lenses;
   a plurality of photo detectors configured to receive incoming light that passes through the one or more optical lenses;
   electrical circuitry configured to, for each of the plurality of photo detectors:
      generate a signal based on an output of the photo detector;
      determine a maximum value of the signal for a certain period of time; and
      convert the maximum signal value to a digital signal; and
   a processing unit configured to:
      receive the digital signal of each of the plurality of photo detectors; and
      determine a direction of the incoming light based, at least in part, on the received digital signals of the plurality of photo detectors.

2. The electro-optical assembly of claim 1, wherein the one or more optical lenses comprise at least one of silicon (Si), optical glass, indium gallium arsenide (InGaAs), or germanium (Ge).

3. The electro-optical assembly of claim 1, wherein the electrical circuitry configured to generate the signal comprises a transimpedance amplifier (TIA).

4. The electro-optical assembly of claim 1, wherein the electrical circuitry configured to determine the maximum value of the signal is a peak hold reset (PHR) circuit.

5. The electro-optical assembly of claim 1, wherein each of the plurality of photo detectors comprises at least one of an avalanche photodiode (APD) or a PIN photodiode.

6. The electro-optical assembly of claim 1, further comprising a spectral filter configured to reject or pass at least a portion of the incoming light before the incoming light reaches the plurality of photo detectors.

7. The electro-optical assembly of claim 1, wherein:
   the plurality of photo detectors comprises a first substrate;
   the electrical circuitry comprises a second substrate coupled with the first substrate.

8. The electro-optical assembly of claim 1, wherein the one or more optical lenses comprises a single optical lens coupled with the plurality of photo detectors.

9. The electro-optical assembly of claim 1, further comprising electrical circuitry configured to, for each of the plurality of photo detectors, increase an amplitude of the signal based on the output of the photo detector if an amplitude of the signal is below a certain threshold level.

10. The electro-optical assembly of claim 1, wherein each of the plurality of photo detectors has a width of about 200 microns and a length of about 200 microns.

11. The electro-optical assembly of claim 1, wherein the plurality of photo detectors are disposed on a substrate and configured to receive the incoming light after the incoming light passes through the substrate.

12. A method for detecting an optical signal, the method comprising:
   receiving the optical signal through one or more optical lenses;
   using a plurality of photo detectors to detect the optical signal after the optical signal passes through the one or more optical lenses;
   generating a plurality of electrical signals, wherein each signal corresponds with an output of each of the plurality of photo detectors;
   determining, for a certain period of time, a maximum value of each of the plurality of signals;
   converting each maximum value to a digital signal; and
   calculating, with a processing unit, a direction of the optical signal based, at least in part, on the received digital signals of the plurality of photo detectors.

13. The method for detecting the optical signal of claim 12, wherein generating the plurality of signals comprises converting a plurality of currents into the plurality of voltages.

14. The method for detecting the optical signal of claim 12, further comprising using a spectral filter configured to allow at least a portion of the optical signal having a wavelength of about 1.5 microns to reach at least a portion of the plurality of photo detectors.

15. The method for detecting the optical signal of claim 12, wherein calculating the direction of the optical signal comprises determining which of the plurality of photo detectors received detected the optical signal with an amplitude above a certain threshold.

16. The method for detecting the optical signal of claim 12, wherein generating the plurality of signals comprises using circuitry on a different substrate than a substrate on which the plurality of photo detectors is disposed.

17. A method of manufacturing an electro-optical assembly, the method comprising:
   providing one or more optical lenses;
   coupling a plurality of photo detectors to the one or more optical lenses such that the plurality of photo detectors are configured to receive incoming light that passes through the one or more optical lenses;
   coupling electrical circuitry to the plurality of photo detectors, wherein the electrical circuitry is configured to, for each of the plurality of photo detectors:
      generate a signal based on an output of the photo detector;
      determine a maximum value of the signal for a certain period of time; and
      convert the maximum value to a digital signal; and
   coupling a processing unit to the electrical circuitry, wherein the processing unit is configured to:
      receive the digital signal of each of the plurality of photo detectors; and
      determine a direction of the incoming light based, at least in part, on the received digital signals of the plurality of photo detectors.

18. The method of manufacturing the electro-optical assembly of claim 17, further comprising coupling a spectral filter to the one or more optical lenses such that the spectral filter passes or rejects at least a portion of the incoming light.

19. The method of manufacturing the electro-optical assembly of claim 17, wherein coupling the electrical circuitry to the plurality of photo detectors comprises coupling the electrical circuitry disposed on a first substrate to the plurality of photo detectors disposed on a second substrate.

20. The method of manufacturing the electro-optical assembly of claim 17, wherein coupling the plurality of photo detectors to the one or more optical lenses comprises configuring the plurality of photo detectors to receive the incoming light after the incoming light passes through a substrate on which the plurality of photo detectors is disposed.

* * * * *